United States Patent Office 2,887,322
Patented May 19, 1959

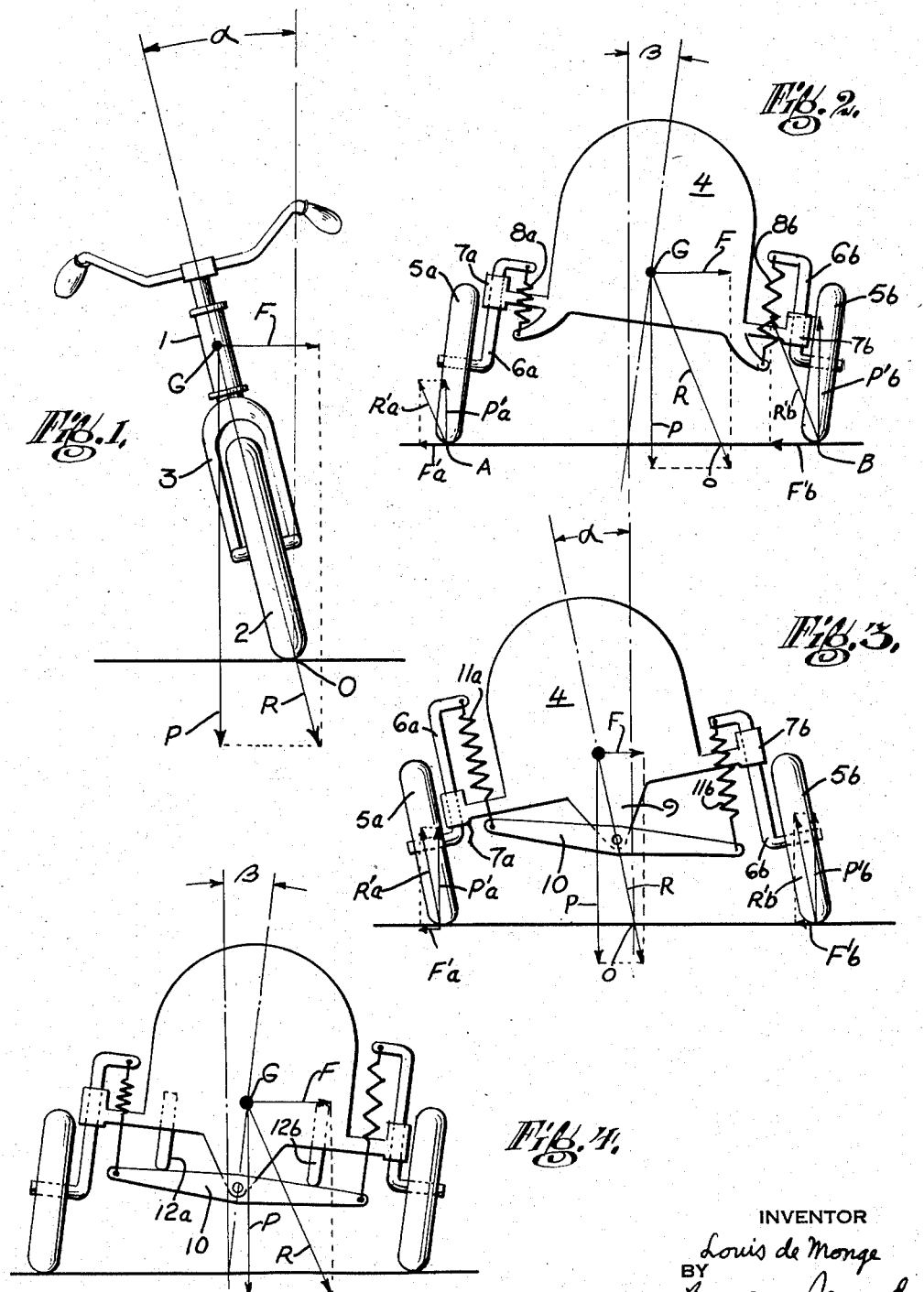

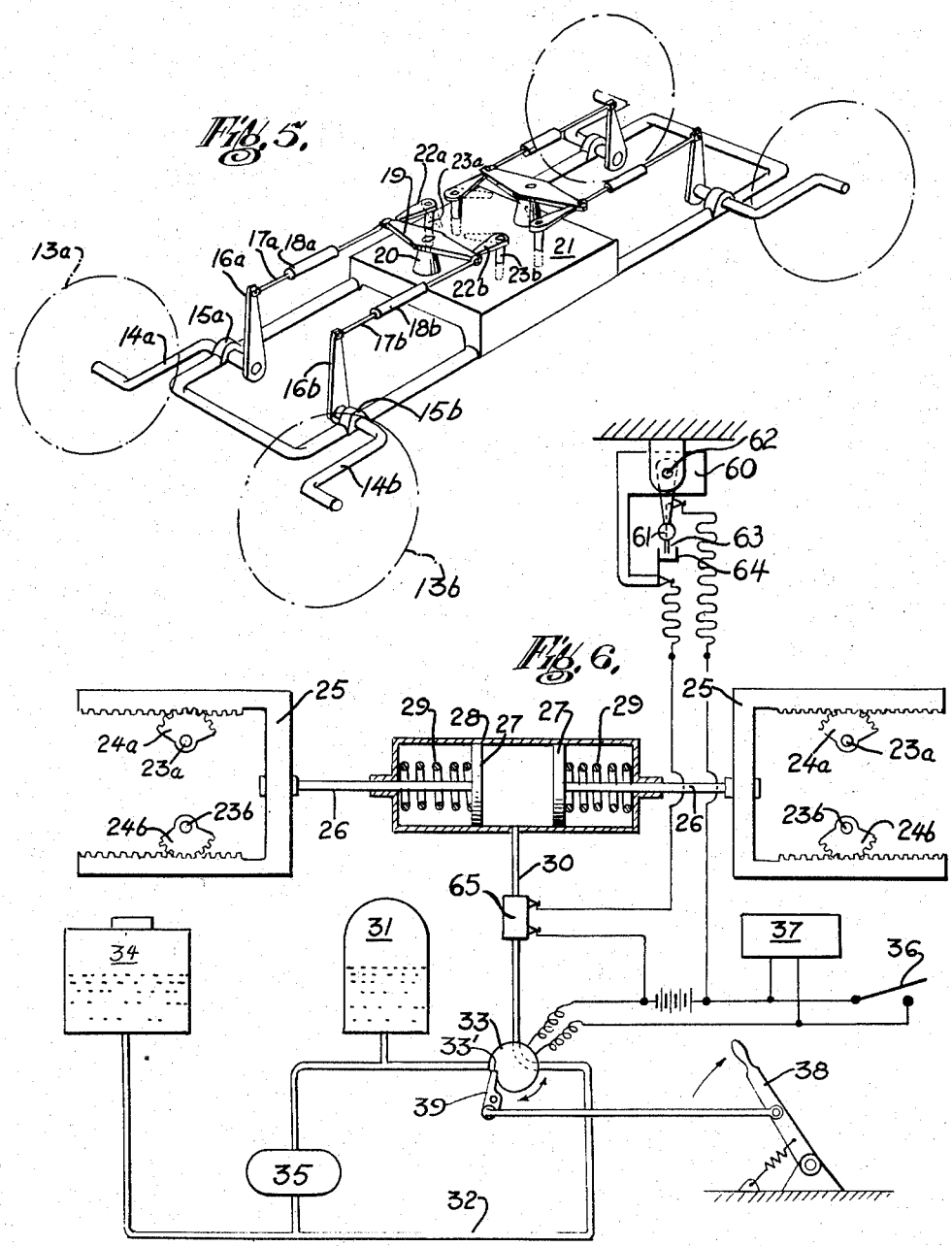

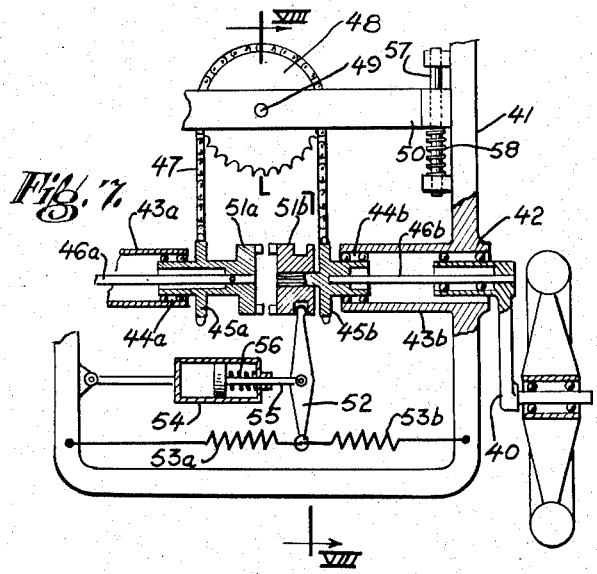
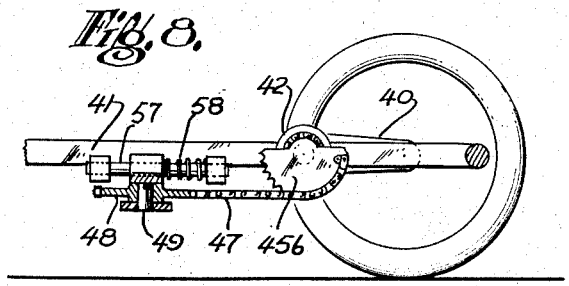

2,887,322
EQUALIZER TYPE VEHICLE SUSPENSION AND LOCKING MEANS THEREFOR

Louis De Monge, Kew Gardens, N.Y.

Application June 9, 1955, Serial No. 514,177

11 Claims. (Cl. 280—104)

This invention relates to vehicle running gear, and particularly to the mutual interconnections between the wheels and chassis of a vehicle, such as a motor vehicle, having three, four or more wheels. While the invention is evidently also applicable to vehicles which are supported on runners (such as skates or skis) or on suitably shaped floats or pontoons, it is shown and described herein, by way of example, as embodied in a wheeled vehicle. References herein to "wheels" will be understood as including such other equivalent supporting elements.

The principal object of the invention is to provide a running gear for a double track vehicle such as to retain all the operational advantages of a single track vehicle (e.g., bicycle) without weight or capacity limitations and thus capable of being fully covered by a closed body.

Another object is to provide certain improvements in the form, construction and arrangement of the parts whereby the above-named object may effectively be attained.

A practical embodiment of the invention is represented in the accompanying drawings, for the most part diagrammatic in nature, in which:

Fig. 1 is a front elevation of a typical conventional single track vehicle (bicycle), showing the forces acting thereon when moving along a curved path;

Fig. 2 is a front elevation of one simplified form of a conventional double track spring-suspended vehicle, showing the forces acting thereon when moving along a curved path and the effect of said forces;

Fig. 3 is a front elevation of a vehicle with one form of suspension according to the invention, showing the forces acting thereon when moving along a curved path and the manner in which said forces are counteracted;

Fig. 4 is a front elevation of the vehicle shown in Fig. 3, the spring stress equalizing mechanism being locked (i.e. the stationary or low speed condition);

Fig. 5 is a perspective view showing a modified form of wheel-chassis linkage according to the invention;

Fig. 6 represents schematically one arrangement for automatic control of the static (or low speed) stability of the vehicle according to speed;

Fig. 7 is a detail plan view of one end of a vehicle according to the invention showing a variant of the spring load equalizer and equalizer locking mechanism;

Fig. 8 is a vertical section taken in the plane of the line VIII—VIII of Fig. 7, looking in the direction of the arrows.

Referring to the drawings, Fig. 1 represents a front elevation of a bicycle under way (the rider being omitted) and is shown for purposes of explanation only. The bicycle is conventional and comprises a frame 1 supported on a wheel 2 (the second wheel being in the same plane) by means of a fork member 3. The lateral equilibrium of such a single track vehicle is statically unstable and the condition of equilibrium is that the resultant force R of the gravity P and the centrifugal force F is included in the plane of symmetry of the vehicle. This condition is practically fulfilled by the rider who is, however, helped in that task by natural dynamic stability resulting from suitable design of the fork and the steering axis of the bicycle; i.e., the location and inclination of the king pin or steering axis is such that the extension thereof intersects the ground at a point in front of the center of the ground-contact area of the tire by a distance called "trail." Such a vehicle, however, cannot stand up alone when stopped and the dynamic stability process requires a certain amount of speed.

G being the center of gravity, the forces acting on the vehicle are the gravity P and the centrifugal force F of which the resultant force is R. In the position of equilibrium, which requires an inward banking angle $\alpha$, the force R reaches the ground at point O which is the intersection of the longitudinal plane of symmetry of the vehicle with the surface of the ground.

Fig. 2 represents the front elevation of a double-track vehicle such as a conventional automobile, shown schematically for purposes of explanation as having a spring and slide suspension system. The body 4 is supported on wheels 5a, 5b through sliding members 6a, 6b passing through guides 7a, 7b. Springs 8a, 8b connect the sliding members to the automobile body frame, representing a simple form of independent suspension. G being the center of gravity of the spring-supported part of the vehicle, the resultant force R of the gravity P and the centrifugal force F meet the ground at a point O dividing the tread into two unequal parts OA, OB. Consequently, the ground reactions P'a, P'b on the two wheels 5a, 5b are unequal. The stresses acting on the two springs 8a, 8b are also unequal, thus causing unequal deflexions which result in an outward banking angle $\beta$.

An increase in the height of the center of gravity G and/or in the centrifugal force F can reduce the value of OB to zero, beyond which point the vehicle will capsize.

In Fig. 3 is shown a front elevation of a double-track vehicle according to the invention, using for purposes of explanation the same wheels, sliding members and guides as in Fig. 2. Here, however, the vehicle body frame is provided with a single central bracket 9 in which is pivotally mounted, for rocking motion in a substantially vertical plane, a load transferring equalizing lever 10, the ends of said lever being connected by springs 11a, 11b (corresponding to the springs 8a, 8b of Fig. 2) to the sliding members 6a, 6b. The effect of the lever 10 is to equalize the stresses of the two springs and thus the components, P'a, P'b acting on the wheels. As a direct consequence, the vehicle will have lost its lateral static stability; only one position of equilibrium exists, the one for which the resultant force R of the gravity P and the centrifugal force F meet the ground at the rolling axis O which is in the longitudinal plane of symmetry at the ground level and divides the tread into two equal parts.

It will become obvious by comparing Figure 3 and Figure 1 that such a vehicle will behave like a single track vehicle. To maintain its equilibrium such a vehicle has to bank inwardly, as shown, to the angle $\alpha$ to fulfill the previously stated equilibrium requirements, such banking being effected exactly as in the operation of a bicycle or motorcycle. The four wheeled vehicle will have natural dynamic stability when its steering mechanism is designed to have "bicycle" characteristics as to steering axis inclination and "trail," as by disposing the guides 7a, 7b (Fig. 3) so as to have a slight rearward slant, assuming that they lie along the respective steering axes.

Figure 4 shows the same vehicle as Figure 3 on which, according to the invention, two locking members 12a, 12b are moved into positions where they lock in a median position the equalizing lever 10. In this condition the vehicle will behave like a conventional double track one as can be seen by comparing Fig. 4 and Fig. 2, the stationary ends of the lever 10 being the exact mechanical equivalents of the stationary points on the frame (in Fig. 2) to which the springs 8a, 8b are attached.

Fig. 5 shows a double track vehicle according to the invention in which the wheels 13a, 13b are mounted on cranks 14a, 14b which are hinged to the frame 1 through bearings 15a, 15b. At the inboard end of each crank are attached upwardly extending levers 16a, 16b to the ends of which are connected rods 17a, 17b, which rods are given longitudinal resilience by the interpolation therein of spring devices 18a, 18b. The other ends of these rods are pivoted to a load-transferring equalizing lever 19 which is pivoted at its center on a pivot 20 fixed on a crossmember 21 between the sides of the chassis frame. Locking members 22a, 22b are mounted on shafts 23a, 23b pivoting on the same crossmember 21. Upon turning said shafts by suitable means (e.g. Fig. 6) the lever 19 may be locked rigidly in the position shown or unlocked so as to be free to rock around its pivot 20.

According to the invention, the locking members for the equalizing lever may be controlled either automatically or under the control of the operator to give static instability to the vehicle chassis at high or moderate speeds and static stability at standstill or at low speed. Thus, the shafts 23a, 23b (Fig. 5) may be operably connected to a suitable lever mechanism within the vehicle so that by turning or moving a handle or a knob the operator can move the locking members from the solid-line (locking) position shown in Fig. 5 to the broken-line position which frees the lever 19 for movement, for the same purpose and with the same result as explained in connection with Fig. 3.

Fig. 6 shows diagrammatically one possible arrangement for automatic control of the locking members 22a, 22b of Fig. 5. It is desirable that said members be placed in locking position for speeds below a certain minimum value, say, 10 or 15 miles an hour, and in unlocked position for speeds above that range.

Accordingly, each shaft 23a, 23b may be provided with a gear tooth segment 24a, 24b engaging the teeth of a double rack 25. Rack 25 is connected by a rod 26 to a piston 27 within a cylinder 28, the piston being cushioned by a suitable return spring 29. The cylinder 28 is connected by a pipe 30 either to a hydro-pneumatic accumulator 31 or to a return pipe 32 by a three way solenoid operated valve 33. Oil from a tank 34 is supplied under pressure to the accumulator 31 by a pump 35, driven by the motor of the vehicle or any other power source (not shown). Control of the solenoid operated valve 33 may be either by a manually operated switch 36 or by a speed-responsive automatic switch 37. Such a switch may be actuated by a centrifugal controller or "governor" driven by one of the wheels of the vehicle or by the drive shaft thereof.

It can be seen by inspection of Figs. 3 and 4 that, when negotiating a curve, the attitude of the vehicle differs fundamentally according to the kind of stability resulting from the wheel supporting means (stable or unstable statically). The total of the opposite banking angles ($\alpha+\beta$) increases with the amount of centrifugal force, thus if a change in the kind of stability takes place when the vehicle is moving along a sharp curve, this change will put the vehicle out of equilibrium, which is obviously undesirable. Accordingly, means are provided to avoid changing the kind of stability (i.e., locking or unlocking the load equalizing means) as long as the vehicle is submitted to any substantial amount of centrifugal force. In one such means (referring to Fig. 6) the solenoid-operated valve 33 is arranged to be automatically controlled only in one direction. A pawl 39 engaging a ratchet tooth 33' restrains the motion of the valve 33 in the reverse direction unless the operator releases said pawl by acting upon a spring loaded lever 38 or any equivalent button or pedal.

As long as the speed increases after starting from standstill, the vehicle remains in stable equilibrium until the operator decides to operate the lever 38 so as to release the load equalizing means, and he would not do this when negotiating a curve, because of the obvious difficulty in bringing the vehicle from the position of Fig. 4 to the position of Fig. 3, for example. During decreasing speed, the return to static stability which must take place before the speed falls below the minimum which is required to be able to control dynamically the equilibrium of the vehicle, may occur automatically without harm since said minimum speed is very low and a high centrifugal force may hardly exist at such a low speed.

Automatic means for preventing undesired changes in stability control may be based on the amount of centrifugal force due to negotiating a curve, for example, by the provision of a pendulum 61 suspended on a common pivot 62 with a gyroscope 60 which is used as a vertical reference. Any divergence between the pendulum and the gyroscope indication is then used (as by closing the contacts 63, 64) to govern a locking mechanism shown as a solenoid-operated valve 65, in order to prevent changes in the conditions of stability control.

The foregoing description of Fig. 5 refers essentially to a single pair of wheels, but it will be noted that the same features are duplicated at the opposite end of the chassis. It may be assumed, if necessary, that the front of the chassis is at the left; it will also be understood that a motor and suitable driving connections between the motor and at least one pair of wheels must be superimposed on the basic elements shown, while means for steering the front wheels will also be added. The duplication just referred to in Fig. 5 is reflected in the duplication of the parts 24a, 24b, 25, 26 and 27 in Fig. 6.

Figs. 7 and 8 show another wheel supporting means arrangement and locking mechanism for a load equalizing means. As in Fig. 5 each wheel is mounted on a crank 40 which is articulated to the chassis frame 41 through a bearing 42. The bearing sleeves 43a, 43b extend inwardly to support bearings 44a, 44b in which run the hubs of toothed segments 45a, 45b. Said toothed segments are connected to the cranks 40 by torsion bar springs 46a, 46b which provide resilient suspension, and are also linked together by a chain 47 which passes around a sprocket 48 freely rotatable on a pivot 49 held by a cross member 50 of the chassis frame. (Pulleys and a cable could obviously be used instead of the segments, sprocket and chain shown.) In order to provide a more resilient suspension the cross member 50 (Fig. 7) may have its ends slidably mounted on short bars 57 fixed to the chassis frame 41 the pull of the chain 47 being resisted by resilient elements such as springs 58.

Chain 47 and sprocket 48 play the same role as rods 17a, 17b and lever 19 in Fig. 5, i.e. they act as spring load equalizing means and thus serve to eliminate lateral static stability.

An axial extension of segment 45b is splined and carries a correspondingly splined, axially movable clutch part 51b, while a matching clutch part 51a is formed on an axial extension of segment 45a. The clutch parts 51a, 51b have complementary square teeth such that they can be locked against relative rotation by engagement of the teeth. A lever 52 is engaged at one end in a groove machined in the part 51b and is held at its other end between two opposite relief springs 53a, 53b.

A hydraulic jack 54 (similar to either half of the jack 28) has its piston rod 55 connected to a point intermediate the ends of the lever 52 so that, when oil pressure in the jack is released, the spring 56 pulls the lever in a direction to cause engagement of the teeth of clutch part 51b with the teeth of part 51a so as to lock the load equalizing means. The clutch teeth can readily be so proportioned that they will engage each other only when the vehicle is in (or near) its upright or unbanked position; if the spring 56 tries to cause engagement of the teeth when the vehicle is banked, it cannot do so and the spring force will be dissipated in part by moving the opposite end of the lever 52 against the tension of relief spring 53b.

Conversely, when the teeth are engaged and oil pressure in the jack 54 overcomes the force of spring 56, the lever is not able to disengage the teeth unless the torsional forces acting on the segments 45a, 45b (and their respective clutch parts) are substantially equal and in the same direction, corresponding to the position of static equilibruim of the vehicle. Otherwise, the friction on the clutch teeth and spline surfaces will hold the clutch parts in engagement, while the hydraulic pressure acting on the lever 52 is dissipated in part by moving its opposite end against the tension of relief spring 53a.

The necessary conditions for changing from static stability to static instability, or vice versa, are most easily met when the vehicle is moving along a straight course on a level road, but in the absence of such naturally ideal conditions the vehicle can normally be maneuvered to create at least a momentary, and effective, simulation thereof.

It will also be appreciated that neither the height of the center of gravity of the vehicle nor the width of its track is a limiting or critical factor in respect of the vehicle's lateral dynamic stability.

As mentioned above, steering and driving linkages are not shown in the rather diagrammatic illustrations of embodiments of this invention. The connection of steering means to independently sprung front wheels is such a commonly known practice that it will be recognized as conventional. Although somewhat less common, there are also many examples of connecting the source of driving power to front or rear wheels which are independently suspended, including chain drive from a fixed point on the chassis to an independently movable wheel stub axle. Two- or four-wheel hydraulic or mechanical brakes are also provided, the linkage and operation being generally conventional. By the proper use of the brakes, the operator can restrain the speed of the vehicle to the permissible range without having to rely on the automatic restraint mentioned above; it is reasonable to assume that the operator will have at least adequate skill and judgment in this respect.

The driving and balancing of a vehicle suspended as described herein is thus no more difficult than the operation of a bicycle or motor-cycle. Because of this analogy to bicycle operation, it will be evident that a single driving and/or steering road wheel may be substituted for either the front or the rear pair of wheels, for instance, in the vehicle of Fig. 5.

It will be understood that various changes may be made in the form, construction and arrangement of the several parts without departing from the spirit and scope of the invention and hence I do not intend to be limited to the particular embodiments herein shown and described.

What I claim is:

1. A terrestrial vehicle comprising, a chassis frame, a pair of wheels symmetrically disposed with respect to the fore-and-aft axis of the frame, wheel-mounting means connecting the axle of each wheel to the frame and arranged to permit relative vertical movement of the wheel with respect to the frame, a linkage between said wheel-mounting means operative to counter-balance forces tending to move one wheel upward with respect to the frame solely by the forces simultaneously tending to move upward the other wheel, means connecting said linkage to the frame so that the sum of said forces is applied symmetrically to said frame for the support thereof, means for locking the linkage so that forces tending to move each wheel can be communicated only to the frame, lock-actuating mechanism automatically operative as a function of the speed of travel of the vehicle and manually operable lock-actuating means in parallel with said automatically operative mechanism.

2. A vehicle according to claim 1 which includes a manually releasable one-way clutch and in which the lock-actuating mechanism which operates automatically as a function of the speed is linked to said clutch in such a way as to prevent automatic operation of said mechanism under conditions of increasing speed, the operator being able to release said one-way clutch at will.

3. A vehicle according to claim 1 which includes a device responsive to centrifugal force and in which the lock actuating mechanism which operates automatically as a function of the speed is under the control of said device and is prevented from operating as long as the vehicle is submitted to substantial centrifugal force.

4. A vehicle according to claim 1 in which the device responsive to centrifugal force is a gyro-pendulum.

5. A vehicle according to claim 1 in which the locking means includes relatively movable elements operatively connected to the linkage of each wheel respectively, means for moving said elements into engagement only when the linkage is in a predetermined position, and means for holding said elements frictionally in engagement so long as the wheels may be subjected to unequal loading.

6. A terrestrial vehicle comprising, a chassis frame, a pair of wheels symmetrically disposed with respect to the fore-and-aft axis of the frame, wheel-mounting means connecting the axle of each wheel to the frame and arranged to permit relative vertical movement of the wheel with respect to the frame, a linkage between the wheel-mounting means on one side of the vehicle and the complementary wheel-mounting means on the opposite side of the vehicle, said linkage including a balancing element normally freely movable to equalize and off-set against each other the vertical load forces from said wheels, means for locking said balancing element immovably to the frame, lock-actuating mechanism automatically operated as a function of the speed of travel of the vehicle and manually operable lock-actuating means in parallel with said automatically operative mechanism.

7. A vehicle according to claim 6 in which the balancing element is a symmetrical lever of the first kind.

8. A vehicle according to claim 6 in which the balancing element is a flexible connecting strip passing around a rotatable guide and in which the linkage includes resilient elements in the form of torsion bars operatively connected between each wheel and said balancing element.

9. A vehicle according to claim 6 in which the balancing element is pivotally mounted to rotate about the axis of a part which is resiliently connected to the frame.

10. A vehicle according to claim 6 in which the chassis frame is provided with a front pair of wheels and with a back pair of wheels, each of said pairs being mounted and connected as claimed.

11. A vehicle according to claim 1 in which the vehicle has at least one steerable front wheel and in which the steering axis is so disposed as to intersect the ground surface at a point sufficiently in advance of the center of the ground-contact area of the wheel's periphery to insure the automatic steering power required to achieve dynamic running stability.

References Cited in the file of this patent

UNITED STATES PATENTS

| | | |
|---|---|---|
| 931,653 | Rosenstengel | Aug. 17, 1909 |
| 1,427,240 | Stanfield | Aug. 29, 1922 |

FOREIGN PATENTS

| | | |
|---|---|---|
| 211,367 | Germany | June 26, 1909 |
| 704,270 | Great Britain | Feb. 17, 1954 |